United States Patent [19]
Sakai et al.

[11] Patent Number: 5,616,100
[45] Date of Patent: Apr. 1, 1997

[54] LOCKUP CONTROL SYSTEM FOR TORQUE CONVERTER

[75] Inventors: Hiromasa Sakai, Yokosuka; Koichi Hayasaki, Ebina, both of Japan

[73] Assignee: Nissan Motor Co, Inc., Yokohama, Japan

[21] Appl. No.: 579,373

[22] Filed: Dec. 27, 1995

[30] Foreign Application Priority Data

Dec. 27, 1994 [JP] Japan ..................... 6-325645

[51] Int. Cl.⁶ .................................. B60K 41/02
[52] U.S. Cl. .................. 477/169; 477/174; 477/175; 477/46
[58] Field of Search ................. 477/64, 65, 168, 477/169, 174, 175, 180, 63, 44, 46

[56] References Cited

U.S. PATENT DOCUMENTS

| | | | |
|---|---|---|---|
| 4,662,493 | 5/1987 | Aoki et al. | 477/168 |
| 4,730,712 | 3/1988 | Ohkumo | 477/175 |
| 5,060,769 | 10/1991 | Yoshimura et al. | 477/169 X |
| 5,063,816 | 11/1991 | Soga et al. | 477/46 X |
| 5,086,894 | 2/1992 | Iizuka et al. | 477/180 X |
| 5,143,191 | 9/1992 | Nobumoto et al. | 477/176 X |
| 5,152,386 | 10/1992 | Imamura | 477/168 |
| 5,213,186 | 5/1993 | Murata | 477/174 X |
| 5,265,017 | 11/1993 | Kaya et al. | 477/174 X |
| 5,277,287 | 1/1994 | Ishii et al. | 477/169 X |
| 5,378,211 | 1/1995 | Slicker et al. | 477/176 X |
| 5,417,622 | 5/1995 | Asayama et al. | 477/65 X |
| 5,480,363 | 1/1996 | Matsubara et al. | 477/63 |
| 5,535,863 | 7/1996 | Vukovich et al. | 477/169 X |

FOREIGN PATENT DOCUMENTS 3-96757  4/1991  Japan .

*Primary Examiner*—Charles A. Marmor
*Assistant Examiner*—Peter Kwon
*Attorney, Agent, or Firm*—Foley & Lardner

[57] ABSTRACT

An improved lockup control system for a lockup-type torque converter for automotive vehicle performs a coasting lockup control of a lockup clutch with minimized response delay of lockup releasing control and suppressed lockup releasing shock upon acceleration of the vehicle. The control system includes a controller that is operative when the driving condition of a vehicle as represented by the throttle valve opening and the vehicle speed is judged to belong to a lockup region. The controller reduces the differential pressure across the lockup clutch to a lower limit value within a range in which the clutch can be prevented from slips. Thus, when the vehicle is reaccelerated and the driving condition shifts out of the lockup region, the reduction amount of the differential pressure is minimized to mitigate the response delay in the lockup releasing control. The differential pressure is reduced gradually in the case of rapid acceleration to avoid occurrence of a lockup releasing shock, and instantaneously to a maximum value in the case of gradual acceleration when the lockup releasing shock is not a problem.

5 Claims, 5 Drawing Sheets

FIG_2

FIG_3

LOCKUP CONTROL SYSTEM FOR TORQUE CONVERTER

BACKGROUND OF THE INVENTION

1. Field of the Invention

The present invention relates generally to a torque converter used for an automatic transmission or the like. More particularly, it pertains to a lockup control system which properly performs a switching depending upon operation of an accelerator pedal, between a lockup mode in which input and output elements of the torque converter are directly coupled to each other, and a converter mode in which the direct coupling between the input and output elements is released.

2. Description of Related Art

Generally, automatic transmission inclusive of continuously variable transmission comprises a torque converter on its input side, to achieve torque multiplication or absorb torque fluctuation. As generally known in the art, ordinary torque converter suffers from a low power transmission efficiency because power is transmitted from the input element to the output element via a working fluid in the converter. Thus, it is a recent trend to employ a lockup-type torque converter comprising a lockup clutch which is capable of directly coupling the input and output elements when torque multiplication function and/or torque fluctuation absorption function are not required, thereby to improve the fuel economy.

As another measure for improving the fuel economy, there is known a system wherein the engine is provided with a fuel cutting device for cutting the fuel supply to the engine in a coasting state of the vehicle with the accelerator pedal released, as it is then generally unnecessary to supply fuel to the engine. The effectiveness of improvement in the fuel economy by means of the fuel cutting device may be considered proportional to the fuel cutting time in which the fuel supply is being cut. Thus, in order to prolong the fuel cutting time and thereby enhance the fuel economy, it is further known to switch the operating range of the torque converter into the lockup region in the coasting state of the vehicle, i.e., into a so-called coasting lockup region.

When the accelerator pedal is redepressed and the operating range of the torque converter is shifted out of the coasting lockup region, it becomes necessary to disengage the lockup clutch and thereby release the lockup. In this instance, as disclosed in Japanese Patent Application Laid-Open Publication No. 3-96,757, for example, it has been a conventional practice to completely disengage the lockup clutch immediately upon redepression of the accelerator pedal, so as to switch the torque converter from the lockup mode into the converter mode.

The above-mentioned conventional lockup control system capable of switching the operating range of the torque converter into the lockup region in the coasting state of the vehicle proved to be highly advantageous in prolonging the fuel cutting time and thereby enhancing the fuel economy, though it would be still desirous to further refine the technology by improving the control function and feel.

DISCLOSURE OF THE INVENTION

The present invention is based on a recognition obtained after thorough research and development, that the conventional lockup control system, which performs a switching of the operating range of the torque converter into the lockup region in the coasting state of the vehicle, may give rise to occurrence of response delay upon a lockup releasing control when the accelerator pedal is depressed and the driving condition is shifted out of the coasting lockup region, or even to generation of lockup releasing shock particularly upon a rapid acceleration of the vehicle when the accelerator pedal is rapidly depressed.

It is therefore a general object of the present invention to provide a refined lockup control system which is free from the potential problem of the prior art, i.e., occurrence of response delay or generation of lockup releasing shock upon a lockup releasing control, and which thus provides an improved control function and feel.

With such a general object in mind, the applicants conducted further investigations which led the applicants to arrive at the following recognitions.

First of all, it has been found that the response delay upon a lockup releasing control tends to occur when a coasting lockup is performed by maximizing the differential pressure across the lockup clutch in the lockup region. This means that the differential pressure across the lockup clutch determines the fastening or lockup capacity of the clutch, and a higher lockup capacity requires a longer time for disengaging the lockup clutch, thereby giving rise to a response delay of the lockup releasing control.

Secondly, it has been also found that the lockup releasing shock tends to be generated upon a rapid acceleration of the vehicle, because the lockup clutch is rapidly completely disengaged as the accelerator pedal is rapidly depressed for effecting a switching of the torque converter from the lockup mode into the converter mode.

Therefore, it is a more specific object of the present invention to eliminate the potential problems of the prior art by a unique control function in which the lockup capacity of the lockup clutch in the coasting lockup region is lowered to a level below a maximum capacity of the lockup clutch, and in which the lockup is gradually released upon a rapid acceleration of the vehicle.

The present invention provides a lockup control system for a torque converter for an automotive vehicle, which includes an input element, an output element and a lockup clutch, and which is operative selectively in a converter region in which rotation of the input element is transferred to the output element via a working fluid within the torque converter, and in a lockup region in which the lockup clutch is engaged by a differential pressure across the clutch for directly coupling the input and output elements.

According to the present invention, the control system comprises (A) lockup region judging means for judging whether a current driving condition of the vehicle belongs to the lockup region or to the converter region, (B) coasting condition detecting means for detecting a coasting condition of the vehicle, (C) lockup capacity reducing means responsive to output signals from the lockup region judging means and the coasting condition detecting means, for reducing a fastening force of the lockup clutch and thereby lowering a lockup capacity thereof to a reduced capacity, (D) rapid acceleration detecting means for detecting whether the driving condition of the vehicle has switched from the coasting condition as detected by the coasting condition detecting means, into a rapid acceleration condition above a predetermined level, and (E) lockup capacity gradual reduction means operative when the rapid acceleration detecting means has detected that the driving condition of the vehicle has switched into the rapid acceleration condition, for further gradually reducing the lockup capacity of the lockup clutch from the above-mentioned reduced capacity.

With the lockup control system according to the present invention, the torque converter serves normally to transmit the rotation of the input element to the output element via a working fluid within the converter, and assumes a lockup state when the lockup clutch is engaged by the differential pressure across the clutch, so as to directly couple the input and output elements of the torque converter with each other, in a conventional manner.

According to the present invention, furthermore, when the lockup region judging means judges that the current driving condition of the vehicle belongs to the lockup region or to the converter region, and the coasting condition detecting means detects a coasting condition of the vehicle, i.e., during coasting of the vehicle in the lockup region of the torque converter or in the coasting lockup region thereof, the lockup capacity reducing means serves to reduce the fastening force of the lockup clutch and thereby lowers the lockup capacity to a reduced capacity. Therefore, when the lockup of the torque converter is released by depressing the accelerator pedal and the operating range of the torque converter is shifted out of the coasting lockup region, it is possible positively to prevent occurrence of a response delay.

Also, when the lockup of the torque converter is released upon a rapid acceleration of the vehicle in which the accelerator pedal is rapidly depressed, the lockup capacity gradual reduction means responds to the signal from the rapid acceleration detecting means having detected that the driving condition of the vehicle has switched into a rapid acceleration condition, from a coasting condition which had been detected by the coasting condition detecting, and serves to further gradually reduce the lockup capacity of the lockup clutch from the above-mentioned reduced capacity. It is therefore possible positively to prevent generation of a lockup releasing shock.

According to an advantageous embodiment of the present invention, the lockup capacity reducing means reduces the fastening force of the lockup clutch depending upon an input torque to the torque converter within such a critical range in which the lockup clutch is prevented from undergoing slipping. In this instance, it is possible to eliminate the problem of response delay in an optimum manner, within a range in which a proper lockup operation of the torque converter is maintained.

According to another advantageous embodiment of the present invention, the control system is interposed in a power transmission path of a continuously variable transmission, and further comprises (F) speed change initiation detecting means for detecting initiation of a speed change of the continuously variable transmission, and (G) lockup clutch reengaging means for reengaging the lockup clutch during a speed change after initiation of the speed change has been detected by the speed change initiation detecting means. In this instance, when a lockup shock is generated upon reengagement of the lockup clutch, it is possible to eliminate a problem of the lockup shock because the lockup shock is masked by the speed change.

According to still another advantageous embodiment of the present invention, the control system further comprises (H) gradual acceleration detecting means for detecting whether the driving condition of the vehicle has switched from the coasting condition as detected by the coasting condition detecting means, into a gradual acceleration condition below the predetermined level, and (I) lockup capacity maximizing means, operative when the gradual acceleration detecting means detects that the driving condition of the vehicle has switched into the gradual acceleration condition, for instantaneously increasing the lockup capacity of the lockup clutch to a maximum lockup capacity. In this instance, in a transition of the vehicle driving condition from the coasting detected condition to the gradual acceleration condition, the lockup clutch can be reengaged without response delay, due to the lockup capacity of the lockup clutch which has been increased to the maximum lockup capacity. It should be noted that, in the transition from the coasting detected condition to the gradual acceleration condition, the reengagement shock of the lockup clutch does not give rise to any problem even when the lockup capacity is increased to the maximum capacity.

According to still another advantageous embodiment of the present invention, the lockup capacity gradual reduction means serves to gradually reduce the fastening force of the lockup clutch to a lower limit value which is greater by a predetermined amount than a minimum allowable value for a control. In this instance, it is possible to improve the response characteristic of the lockup clutch upon its reengagement after the reduction of the fastening force.

BRIEF DESCRIPTION OF THE DRAWINGS

The present invention will now be explained in further detail hereinafter, with reference to a specific embodiment shown in the accompanying drawings, in which.

DESCRIPTION OF THE PREFERRED EMBODIMENTS

Figure 1:
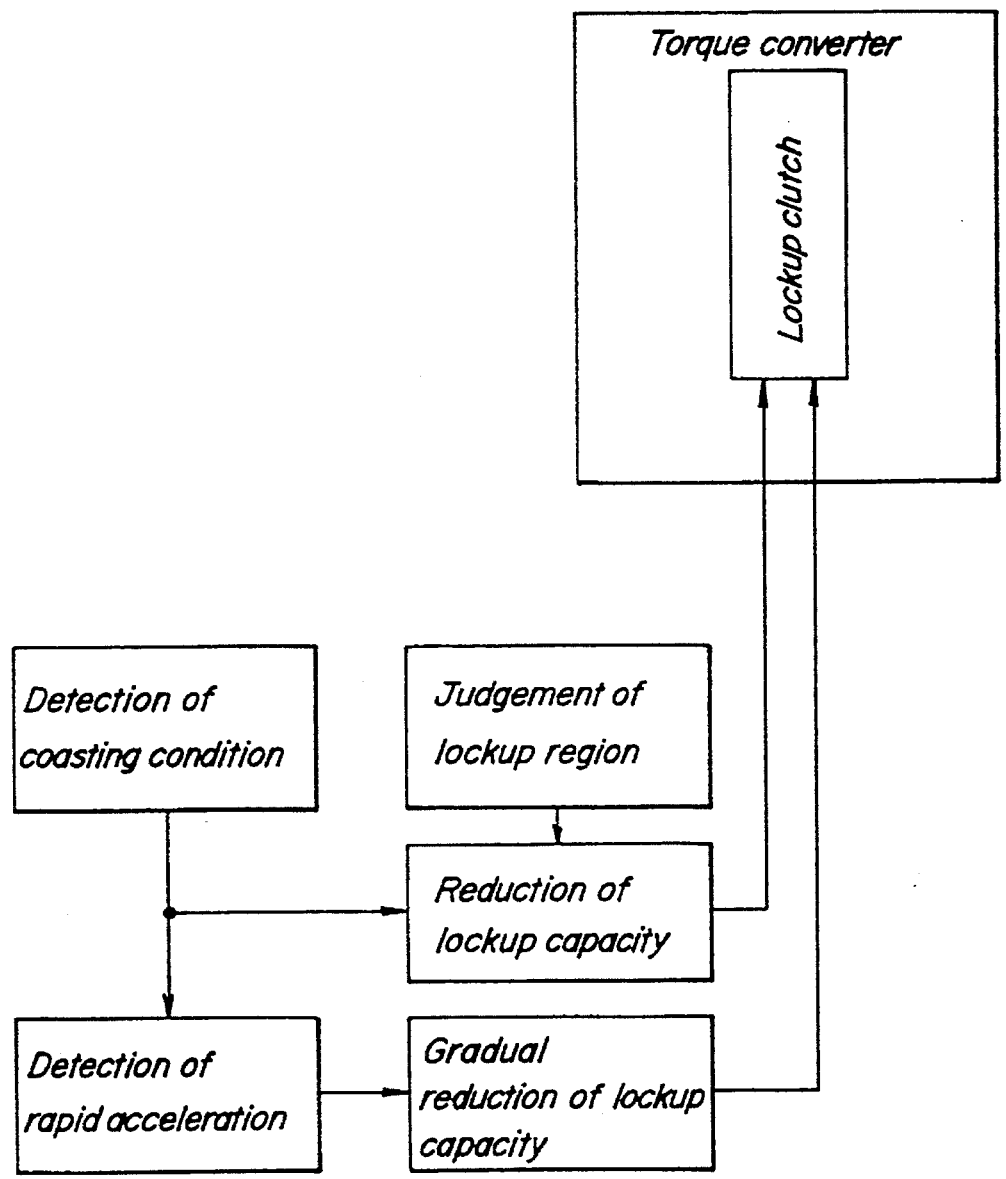
FIG. 1 is a schematic view showing the general concept of the present invention.

Referring now to FIG. 1, which shows the general inventive concept as explained above, the lockup control system according to the present invention is applied to a torque converter of an automatic transmission including a an input element, an output element and a lockup clutch. The torque converter is operative selectively in a converter mode in which rotation of the input element is transferred to the output element via a working fluid within the torque converter, and in a lockup mode in which the lockup clutch is engaged by a differential pressure across the clutch for directly coupling the input and output elements. Such a torque converter is known, per se.

Generally stated, as shown in FIG. 1, the lockup control system according to the present invention includes a lockup region judging means which serves to judge whether a current driving condition of the vehicle belongs to the lockup region or to the converter region. A coasting condition detecting means serves to detect a coasting condition of the vehicle. A lockup capacity reducing means is responsive to output signals from the lockup region judging means and the coasting condition detecting means, and serves to reduce a fastening force of the lockup clutch and thereby lower a lockup capacity thereof to a reduced capacity. A rapid acceleration detecting means serves to detect whether the driving condition of the vehicle has switched from the coasting condition as detected by the coasting condition detecting means, into a rapid acceleration condition above a predetermined level. Finally, a lockup capacity gradual reduction means is operative when the rapid acceleration detecting means has detected that the driving condition of the vehicle has switched into the rapid acceleration condition, and serves to further gradually reduce the lockup capacity of the lockup clutch from the above-mentioned reduced capacity.

Figure 2:
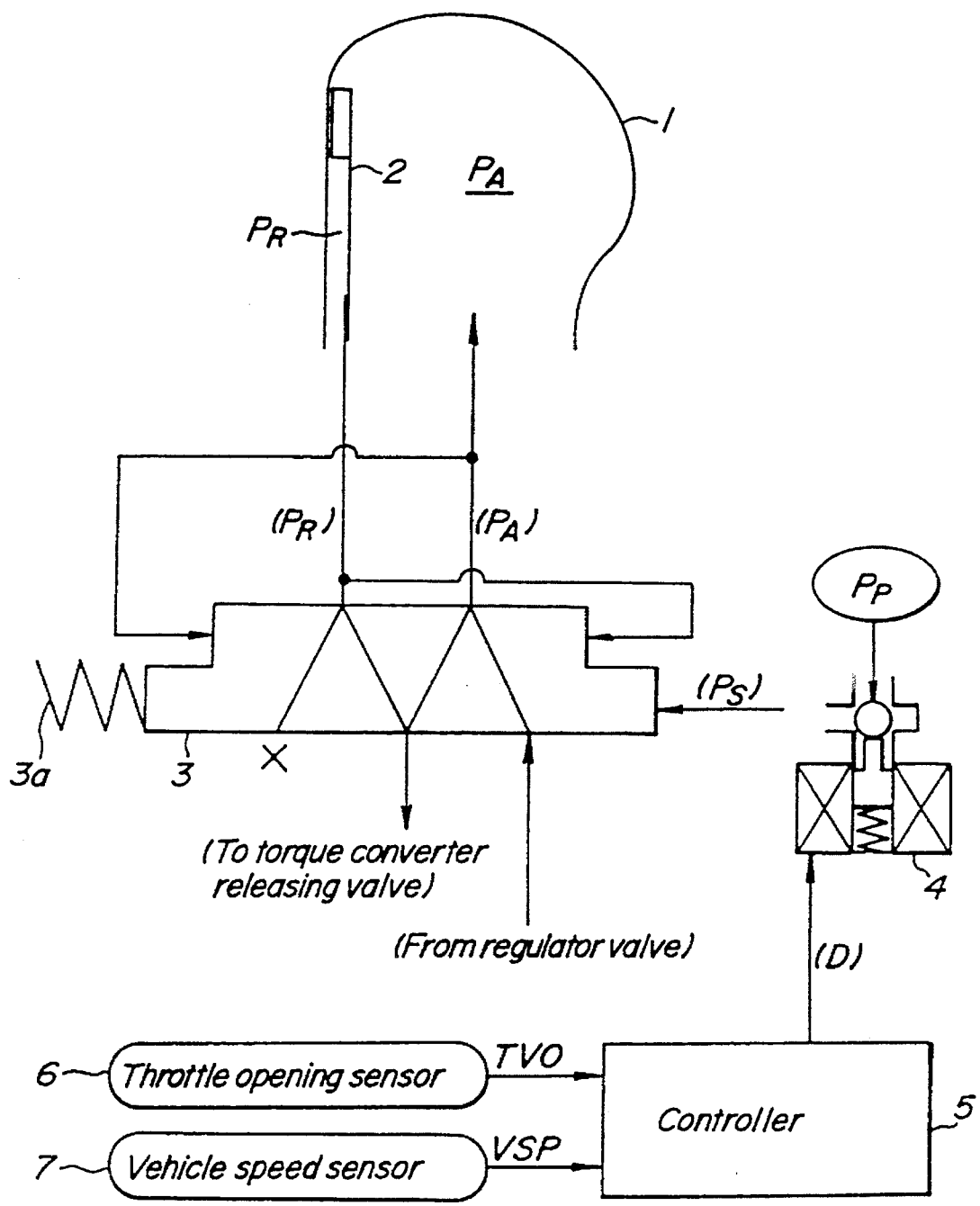
FIG. 2 is a schematic view showing one embodiment of the lockup control system for a torque converter according to the present invention.

With reference to FIG. 2, which shows one preferred embodiment of the lockup releasing control system according to the present invention, reference numeral 1 denotes a torque converter which is interposed in a power transmission path of an automatic transmission which may be a continuously variable transmission. It may be assumed that the torque converter 1 is a lockup-type converter which is described in "Service Manual for RE401A-type Automatic Transmission" (A261C07) issued by Nissan Motor Co., Ltd., the disclosure of which is herein incorporated by reference. In this instance, the torque converter 1 serves to normally transmit power between the input and output elements via a working fluid within the converter. The torque converter 1 includes a lockup clutch 2 incorporated therein, which is rotatable with the output element. The lockup clutch 2 can be engaged with the input element to achieve a lockup state of the torque converter 1 in which the input and output elements are directly coupled to each other.

The lockup clutch 2 is responsive to a differential pressure $P_{A-PR}$ between the torque converter apply pressure $P_A$ and the torque converter release pressure $P_R$ which are applied on opposite side of the lockup clutch 2. More particularly, during the period in which the release pressure $P_R$ is higher than the apply pressure $P_A$, the lockup clutch 2 is maintained in a disengaged state without achieving a direct coupling of the input and output elements. Conversely, when the release pressure $P_R$ becomes lower than the apply pressure $P_A$, the lockup clutch 2 is engaged state to achieve a direct coupling of the input and output elements. In the latter asci in which the lockup clutch 2 is engaged, the lockup capacity of the lockup clutch 2 is determined by the differential pressure $P_A-P_R$ such that a greater differential pressure results in increased lockup capacity of the lockup clutch 2. The disengagement of the lockup clutch is achieved when the differential pressure $P_A-P_R$ is reduced to be lower than zero.

Figure 3:
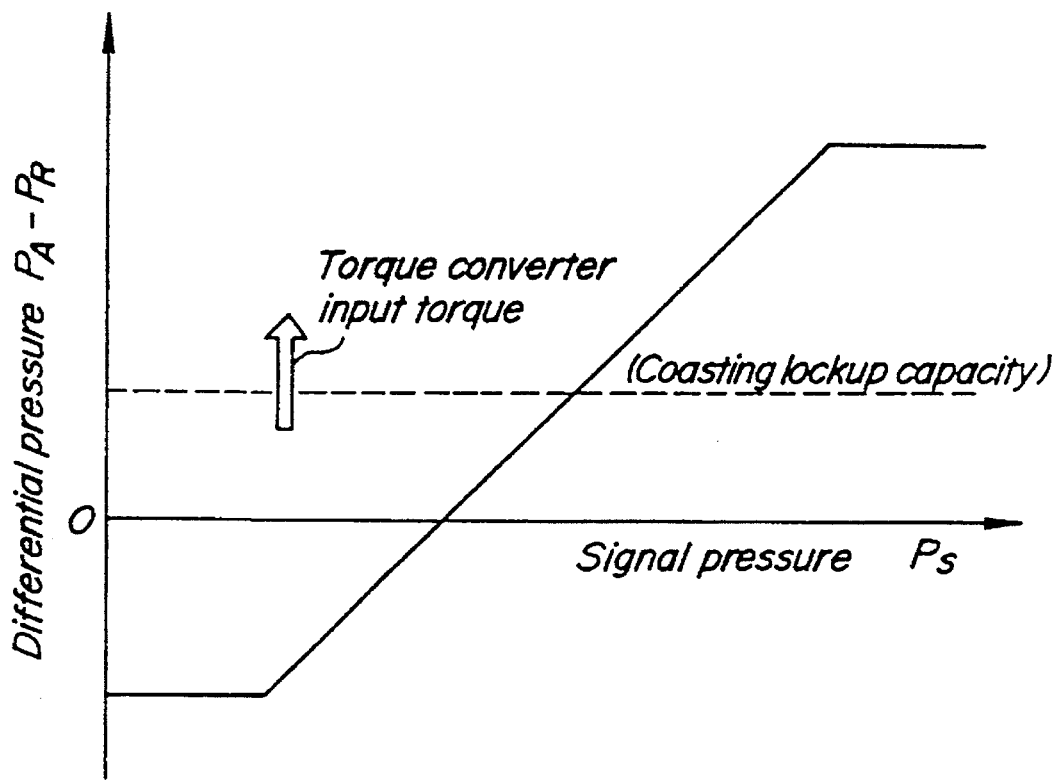
FIG. 3 is a graph showing the operational characteristic of the lockup control valve in the system of FIG. 2.

The differential pressure $P_A-P_R$ is controlled by a lockup control valve 3 which is known, per se. The lockup control valve 3 is applied by the apply pressure $P_A$ and the release pressure $P_R$ inopposite directions. The lockup control valve 3 is further applied by a spring force of a spring 3a in the same direction as the apply pressure $P_A$, and by a signal pressure $P_S$ in the same direction as the release pressure $P_R$. The lockup control valve 3 determines the differential pressure $P_A-P_R$ so that these forces are brought into equilibrium with each other. In this connection, it may be assumed that the differential pressure $P_A-P_R$ changes with a characteristic such as that shown in FIG. 3, depending upon the signal pressure $P_S$.

The signal pressure $P_S$ is generated on the basis of a pump pressure $P_p$, by a lockup solenoid 4 in accordance with a lockup duty D, and the duty D for the lockup solenoid is electronically controlled by a controller 5. The controller 5, in turn, is supplied with a signal from a throttle valve opening sensor 6 for detecting the throttle valve opening TVO of an engine (not shown) which is connected to the input side of the torque converter 1, and a signal from a vehicle speed sensor 7 for detecting the vehicle speed VSP.

Figure 4:
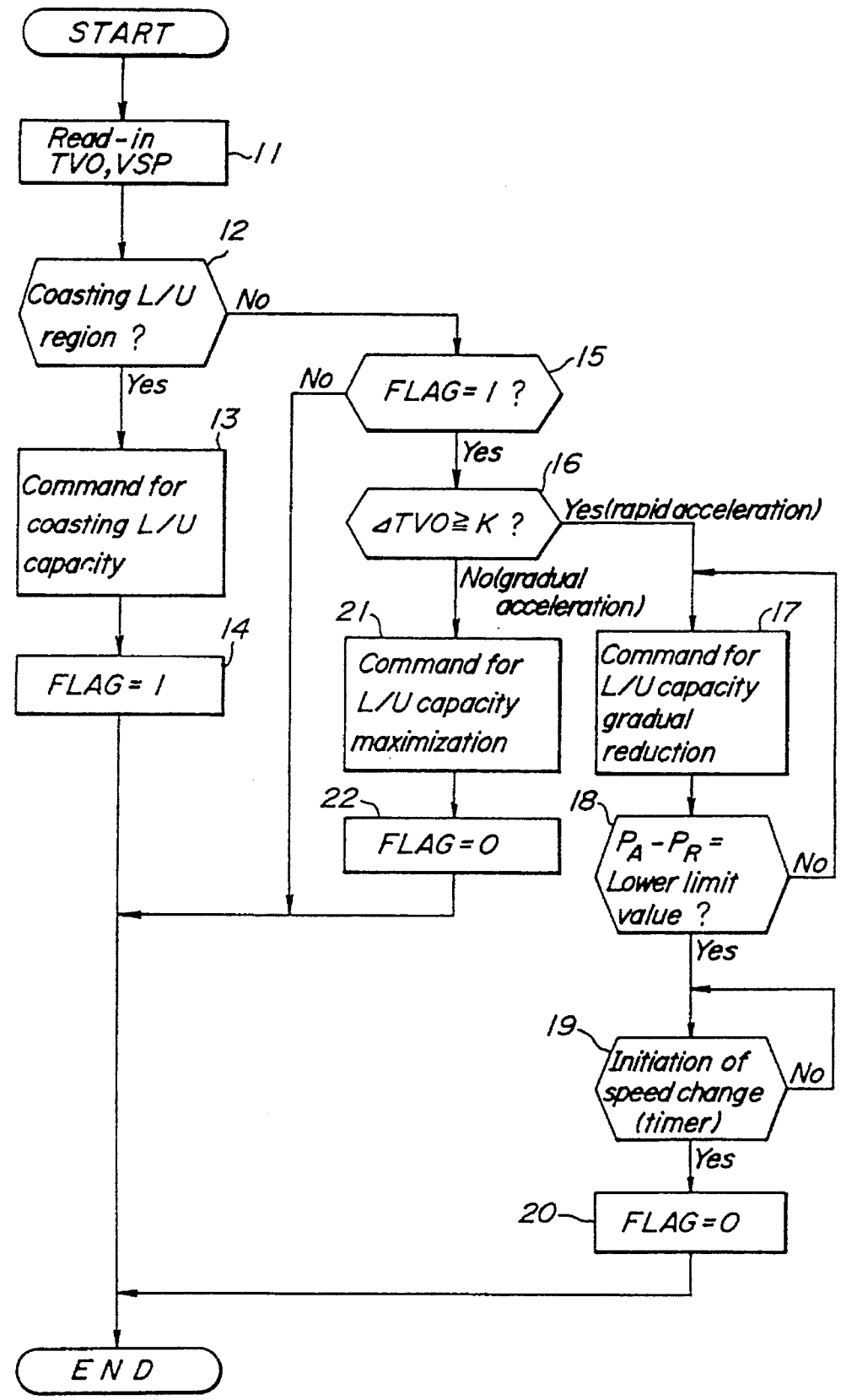
FIG. 4 is a flow chart showing the routine of a lockup control program executed by the controller in the system of FIG. 2.

Based on these input information, the controller 5 executes the control program shown in FIG. 4, to perform a duty control of the lockup solenoid 4 and thereby achieve a lockup control of the torque converter 1 in the coasting lockup region, and a lockup releasing control when an accelerator pedal of the vehicle is depressed to reaccelerate the vehicle and the operating condition of the torque converter is shifted out of the coasting lockup region. More particularly, in the initial step 11 in FIG. 4, the throttle valve opening TVO and the vehicle speed VSP are read-in. Then, in a subsequent step 12 which corresponds to the lockup region judging means and the coasting condition detecting means, a judgement is made based on the combination of the throttle valve opening TVO and the vehicle speed VSP, as to whether the current driving condition of the vehicle belongs to a coasting lockup region, i.e., a coasting condition in a lockup region in which the torque converter is to be locked-up, or to other control region, i.e., a converter region in which the torque converter 1 is to be maintained in the converter mode.

If it is judged at the step 12 that current driving condition belongs to a coasting lockup region, the control advances to a subsequent step 13 which corresponds to a lockup capacity reducing means, where a coasting lockup capacity is calculated and a corresponding duty D is supplied to the lockup solenoid 4. Here, the coasting lockup capacity refers to a critical fastening state of the lockup clutch in the coasting condition of the vehicle, in which the lockup clutch is engaged with as minimized force as possible which is capable of preventing the slip of the lockup clutch. The coasting lockup capacity may be determined depending upon the input torque to the torque converter, such as that shown in FIG. 3 by a broken line. From practical reasons, the input torque to the torque converter is preferably determined by calculation based on the characteristic curve of the torque converter.

In a subsequent step 14, in order to indicate that the lockup control in the coasting lockup region has been initiated, a coasting lockup flag FLAG is set to 1 and used for subsequent control steps.

If it is judged at the step 12 that current driving condition does not belong to a coasting lockup region, the control advances to a subsequent step 15 to determine from the above-mentioned flag FLAG, whether the lockup control in the coasting lockup region has already been initiated. It is of course that if it has been determined at the step 15 that the lockup control has not been initiated, the control is terminated and an ordinary lockup control is performed.

Conversely, if it has been determined at the step 15 that the lockup control has already been initiated, the control advances to a subsequent step 16 which corresponds to the rapid acceleration detecting means. In the step 16, a determination is made as to whether the difference ΔTVO between the currently read value TVO and the previous value TVO (OLD) of the throttle valve opening is same as, or greater than a predetermined value K, i.e., whether the vehicle driving condition has changed from the above-mentioned coasting lockup state into a rapid acceleration condition. If it has been determined at the step 16 that the vehicle driving condition has changed into a rapid acceleration condition, the control advances to subsequent step 17 which corresponds to the lockup capacity gradual reduction means. At the step 17 the duty for the lockup solenoid 4 is changed with time such that the lockup capacity of the lockup clutch is gradually reduced from the coasting lockup capacity determined at the step 13. And, such a gradual reduction of the lockup capacity is terminated at a subsequent step 18, when the differential pressure $P_A-P_R$ which determines the lockup capacity is reduced to a lower limit value which is greater by a predetermined amount than a minimum allowable differential pressure which allows the control to be performed. Here, it is possible to further improve the response characteristic of the system upon a subsequent reengagement of the lockup clutch, by maintaining the lockup capacity at the lower limit value greater than the above-mentioned minimum allowable differential pressure.

As explained above with reference to the illustrated embodiment, according to the present invention, the lockup capacity of the lockup clutch is reduced by decreasing the fastening or engaging force of the lockup clutch depending upon the input torque of the torque converter, to such a critically minimized value as to prevent the slip of the lockup clutch. Therefore, on the occasion of the lockup releasing control when the accelerator pedal of the vehicle is depressed and the operating condition of the torque converter is shifted out of the coasting lockup region, it is possible to prevent occurrence of response delay of the lockup releasing control in an optimized manner.

Moreover, according to the present invention, when the lockup of the lockup clutch is to be released under a rapid acceleration condition of the vehicle in which the accelerator pedal is rapidly depressed, the lockup capacity of the lockup clutch is gradually reduced from the above-mentioned coasting lockup capacity. Therefore, it is also possible effectively to prevent occurrence of a lockup releasing shock which otherwise tends to occur in such rapid acceleration condition of the vehicle.

In a subsequent step 19 which corresponds to the speed change initiation detecting means, a detection is made with a timer or the like, as to whether or not a continuously variable transmission (not shown) including the torque converter 1 in its power transmission path has initiated a speed change. If it has been detected that the transmission has initiated a speed change and is performing a speed change, the control advances to a subsequent step 20 where the above-mentioned coasting lockup flag FLAG is set to 1 to indicate the current situation. Thus, the control is terminated at the step 15 and an ordinary lockup control is performed. This means that the lockup clutch is reengaged during the speed change after the transmission has initiated the speed change.

In this instance, the lockup shock which occurs upon reengagement of the lockup clutch can be masked by the speed change, thereby eliminating the problem of lockup shock.

If it has been judged in the step 16 that the vehicle is being driven under a gradual acceleration condition, or if the acceleration is gradually performed even in the case of a transition from the coasting lockup region into an acceleration condition, the control advances to a subsequent step 21 which corresponds to the lockup capacity maximizing means. In the step 21, the duty D for the lockup solenoid 4 is determined and outputted so that the lockup capacity is instantaneously maximized, and the flag FLAG is reset to 0 in a subsequent step 22.

Here, during the transition from the coasting lockup region to a gradual acceleration condition, the lockup shock upon reengagement of the lockup clutch is not a problem even when the lockup capacity of the lockup clutch is maximized instantaneously. Therefore, the above-mentioned control serves to perform reengagement of the lockup clutch during the transition into the gradual acceleration condition without response delay, while preventing undesired slip of the lockup clutch.

Figure 5:
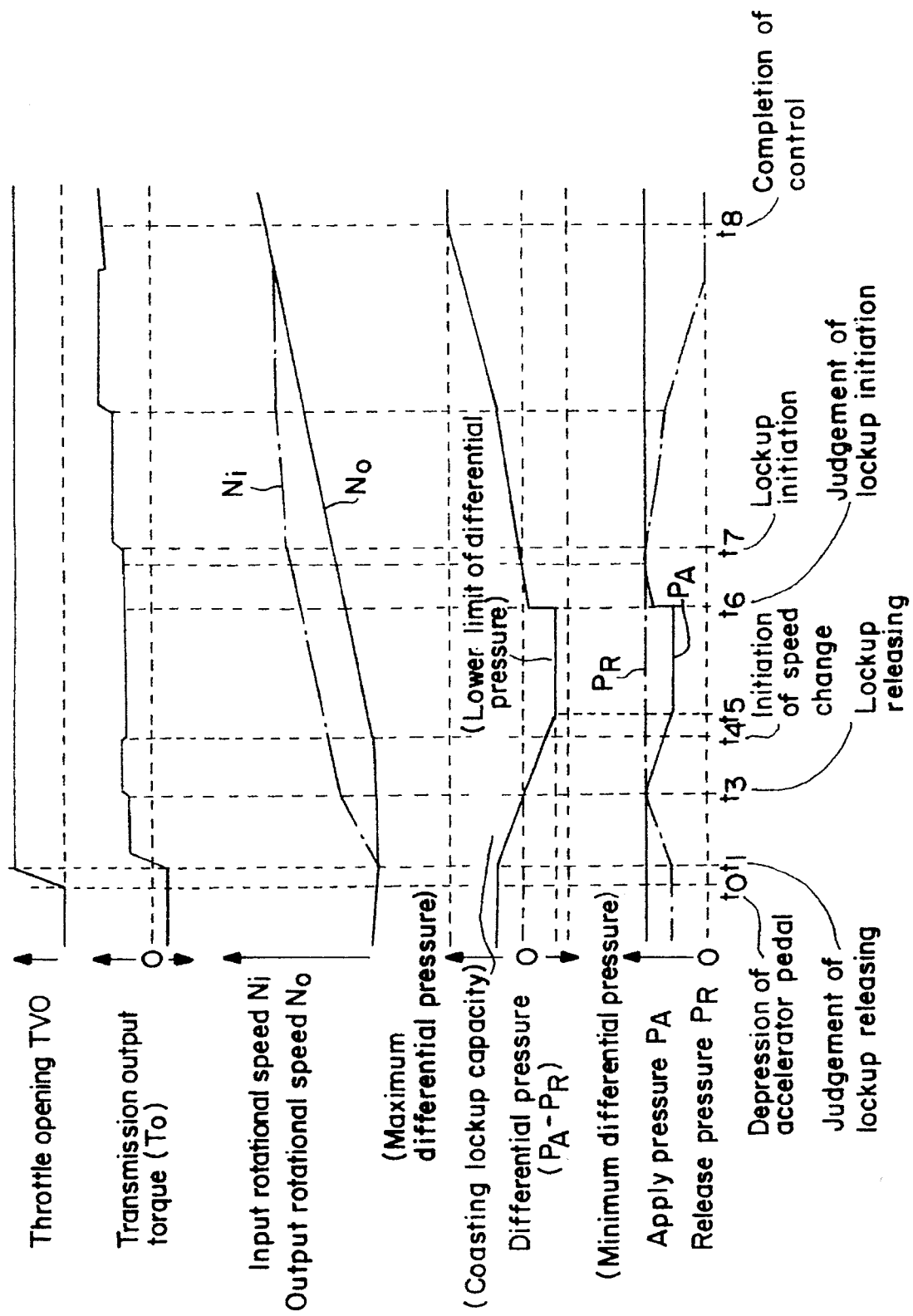
FIG. 5 is an operational time chart of the lockup control performed by the system of FIG. 2.

Referring to FIG. 5, there is shown the operational time chart of the lockup control performed by the system of FIG. 2. The vehicle is driven under a coasting condition up to the instant $t_0$, in which the operating condition of the torque converter is a coasting lockup condition with the throttle valve opening TVO being zero. The differential pressure PA-PR across the lockup clutch in this period is controlled so as to correspond with the coasting lockup capacity as determined at the step 13. When the accelerator pedal of the vehicle is rapidly depressed so that the vehicle begins to rapidly accelerate, accompanying a rapid change in the throttle valve opening TVO, the differential pressure PA-PR is controlled from the instant $t_1$ corresponding to the gradual reduction of the lockup capacity at the step 17. Here, the lockup is released at the instant $t_3$ when the differential pressure PA-PR becomes zero, and the control of the differential pressure PA-PR corresponding to the gradual reduction of the lockup capacity is terminated at the instant $t_5$ when the differential pressure PA-PR becomes the lower limit value which is greater by a predetermined amount than the minimum allowable differential pressure in terms of control.

Subsequently, as a result of determination of an ordinary lockup region, when a lockup demand is determined at the instant $t_6$, a lockup command is outputted to achieve an ordinary reengagement of the lockup clutch at the instant $t_7$. In this case, the lockup command is outputted either at the instant $t_6$ of the lockup command determination when, for example, the speed change of the continuously variable transmission has already been initiated at the instant $t_4$, or after the initiation of the speed change if it has not yet been initiated.

It will be appreciated from the foregoing detailed description that the present invention provides a refined lockup control system which is featured by a unique control function in which the lockup capacity of the lockup clutch in the coasting lockup region is lowered to a level below a maximum capacity of the lockup clutch, and the lockup is gradually released upon a rapid acceleration of the vehicle, so as to eliminate the potential problem of the prior art, i.e., occurrence of response delay or generation of lockup releasing shock upon a lockup releasing control, and to thereby provide an improved control function and feel.

While the present invention has been explained with reference to a specific embodiment, such a particular disclosure has been presented by way of example only, and various modifications and/or alterations may be made without departing from the scope of the invention as defined by the appended claims.

We claim:

1. A lockup control system for a torque converter for an automotive vehicle, said torque converter including an input element, an output element and a lockup clutch, and being operative selectively in a converter region in which rotation of the input element is transferred to the output element via a working fluid within the torque converter, and in a lockup region in which the lockup clutch is engaged by a differential pressure across the clutch for directly coupling the input and output elements, wherein said control system comprises:

lockup region judging means for judging whether a current driving condition of the vehicle belongs to the lockup region or to the converter region;

coasting condition detecting means for detecting a coasting condition of the vehicle;

lockup capacity reducing means responsive to output signals from said lockup region judging means and said coasting condition detecting means, for reducing a fastening force of the lockup clutch and thereby lowering a lockup capacity thereof to a reduced capacity;

rapid acceleration detecting means for detecting whether the driving condition of the vehicle has switched from the coasting condition as detected by said coasting condition detecting means, into a rapid acceleration condition above a predetermined level; and lockup capacity gradual reduction means operative when said rapid acceleration detecting means has detected that the driving condition of the vehicle has switched into the rapid acceleration condition, for further gradually reducing the lockup capacity of the lockup clutch from said reduced capacity.

2. The control system according to claim 1, wherein said lockup capacity reducing means reduces the fastening force of the lockup clutch depending upon an input torque to the torque converter within such a range as to prevent the lockup clutch from undergoing slipping.

3. The control system according to claim 1, wherein said system is interposed in a power transmission path of a continuously variable transmission, further comprising:

speed change initiation detecting means for detecting initiation of a speed change of the continuously variable transmission; and lockup clutch reengaging means for reengaging the lockup clutch during a speed change after initiation of the speed change has been detected by said speed change initiation detecting means.

4. The control system according to claim 1, further comprising:

gradual acceleration detecting means for detecting whether the driving condition of the vehicle has switched from the coasting condition as detected by said coasting condition detecting means, into a gradual acceleration condition below said predetermined level; and lockup capacity maximizing means, operative when said gradual acceleration detecting means has detected that the driving condition of the vehicle has switched into the gradual acceleration condition, for instantaneously increasing the lockup capacity of the lockup clutch to a maximum lockup capacity.

5. The control system according to claim 1, wherein said lockup capacity gradual reduction means gradually reduced the fastening force of the lockup clutch to a lower limit value which is greater by a predetermined amount than a minimum allowable value for a control.

* * * * *